April 17, 1928.

W. BUBEN 1,666,770

CAMERA HOLDING STAND

Filed Jan. 21, 1927

William Buben, INVENTOR

Victor J. Evans, ATTORNEY

Patented Apr. 17, 1928.

1,666,770

UNITED STATES PATENT OFFICE.

WILLIAM BUBEN, OF ST. LOUIS, MISSOURI.

CAMERA-HOLDING STAND.

Application filed January 21, 1927. Serial No. 162,519.

This invention relates to a device for holding a camera, the general object of the invention being to provide a holder for a camera so that the camera can be adjusted in relation to a table for permitting enlargements as well as reductions of a picture to be made.

Another object of the invention is to provide counterbalancing weights for holding the camera holder in any position to which the holder has been moved and with a screw device for focusing the camera after the holder has been adjusted.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
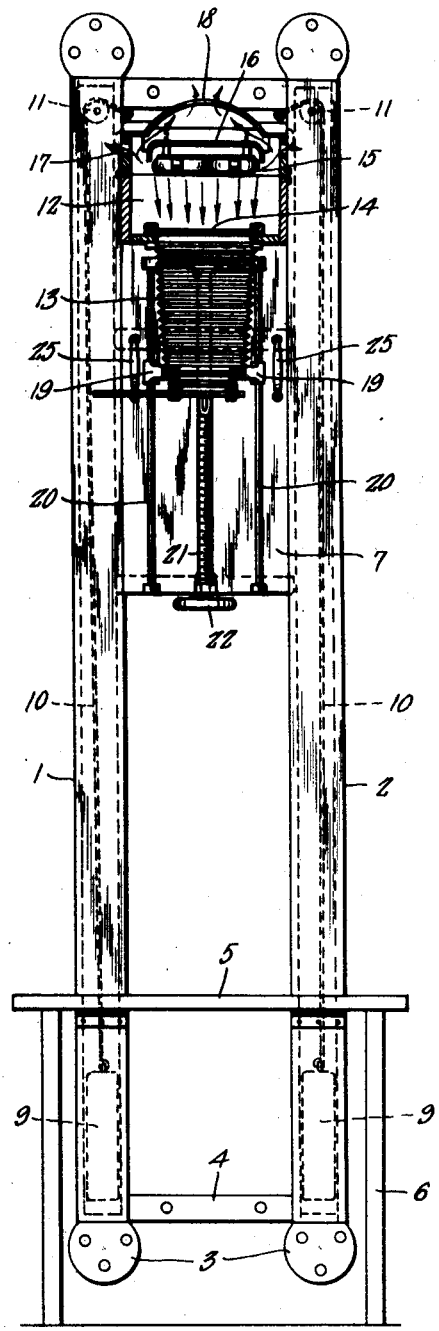
Figure 2:
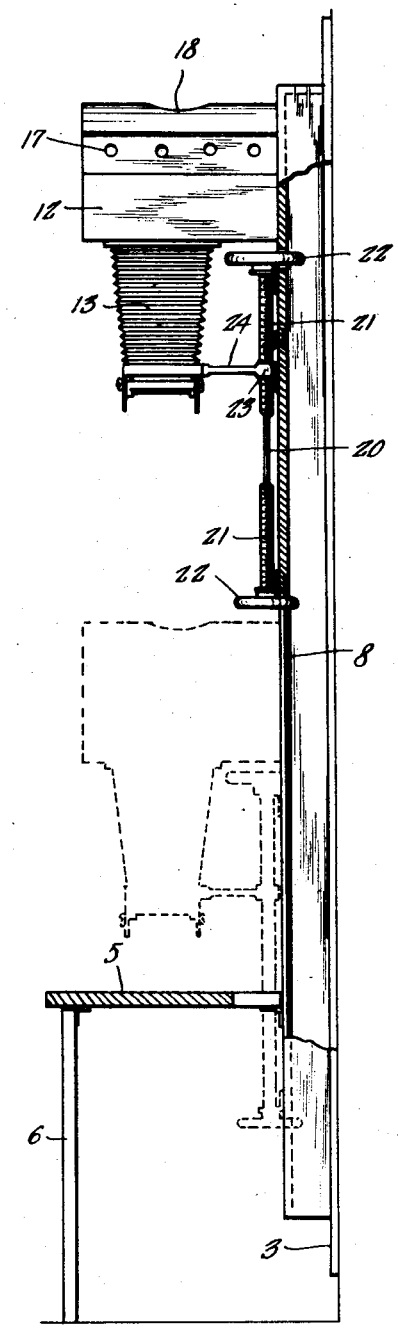

Figure 1 is an elevation of the invention.
Figure 2 is a side view thereof.

In these views, 1 and 2 indicate a pair of uprights which are adapted to be fastened to a wall or other support by the end pieces 3 connected with the uprights and the cross pieces 4 which connect the ends of the uprights together. A table 5 is hinged to the lower part of the uprights and has a pair of front legs 6 which are hinged to the table so that the table can be folded against the uprights when not in use. A plate 7 is slidably supported between the uprights by having its edges engaging guideways 8 formed in the inner edges of the uprights. Each upright is of channel shape in cross section and forms a guideway for a weight 9 which is connected to the top of the plate by a cable 10 which passes over a pulley 11 at the upper end of each upright. A casing 12 is fastened to the upper end of the plate, and the upper end of the camera bellows 13 is attached to the bottom of the casing, the casing having an opening therein which places the bellows in communication with the casing and the walls of the said opening are provided with guideways for the negative.

Lamps 15 are placed in the casing, the rays of light of which are directed through the opening and through the camera by means of the reflector 16 placed in the casing above the lamps. Openings 17 are formed in the side of the casing and a large opening 18 is formed in the hinged top of the casing to permit the heat produced by the lamps to pass from the casing. Guiding arms 19 are fastened to the front of the camera and engage the guiding rods 20 which are carried by the plate. A screw shaft 21 is rotatably supported on the plate and has a handle 22 at each end thereof and a nut member 23 engages said shaft and is connected by an arm 24 with the front part of the camera so that when the shaft is turned, the bellows of the camera will be expanded or contracted according to the direction of movement of the shaft. Handles 25 are fastened to the plate so that it can be moved by hand.

From the foregoing, it will be seen that the camera and casing are fastened to the plate and that by moving the plate, the camera can be moved to the desired position in relation to the table upon which the sensitized medium is placed. Then by turning the shaft, the camera can be focused to project the image on the negative upon the sensitized medium on the table by expanding or contracting the bellows to properly position the lens. It will be understood that the weights will hold the plate and the parts thereon in the position to which they are adjusted by hand. As before stated, this device can be used for making enlargements as well as reductions.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising an upright supporting frame including a pair of channel-shaped uprights, each having a guideway formed in its inner face, a supporting member vertically movable in the guideways, a pair of counter-balancing weights movable in the channels of said uprights, cables connecting the same with the supporting member, a casing carried by the supporting member, an enlarging and reducing camera associated with the casing, lamps in the casing, guiding rods carried by the supporting member, arms connected with the front of the camera and having parts engaging the guiding rods, a screw shaft carried by the supporting member, a handle on the shaft, a nut member engaging the shaft and connected with the front of the camera and a handle on the supporting member.

In testimony whereof I affix my signature.

WILLIAM BUBEN.